Jan. 22, 1957  G. DARRIEUS  2,778,243
DEVICE FOR AUTOMATIC BALANCING OF
ROTATING MACHINE PARTS
Filed June 22, 1953
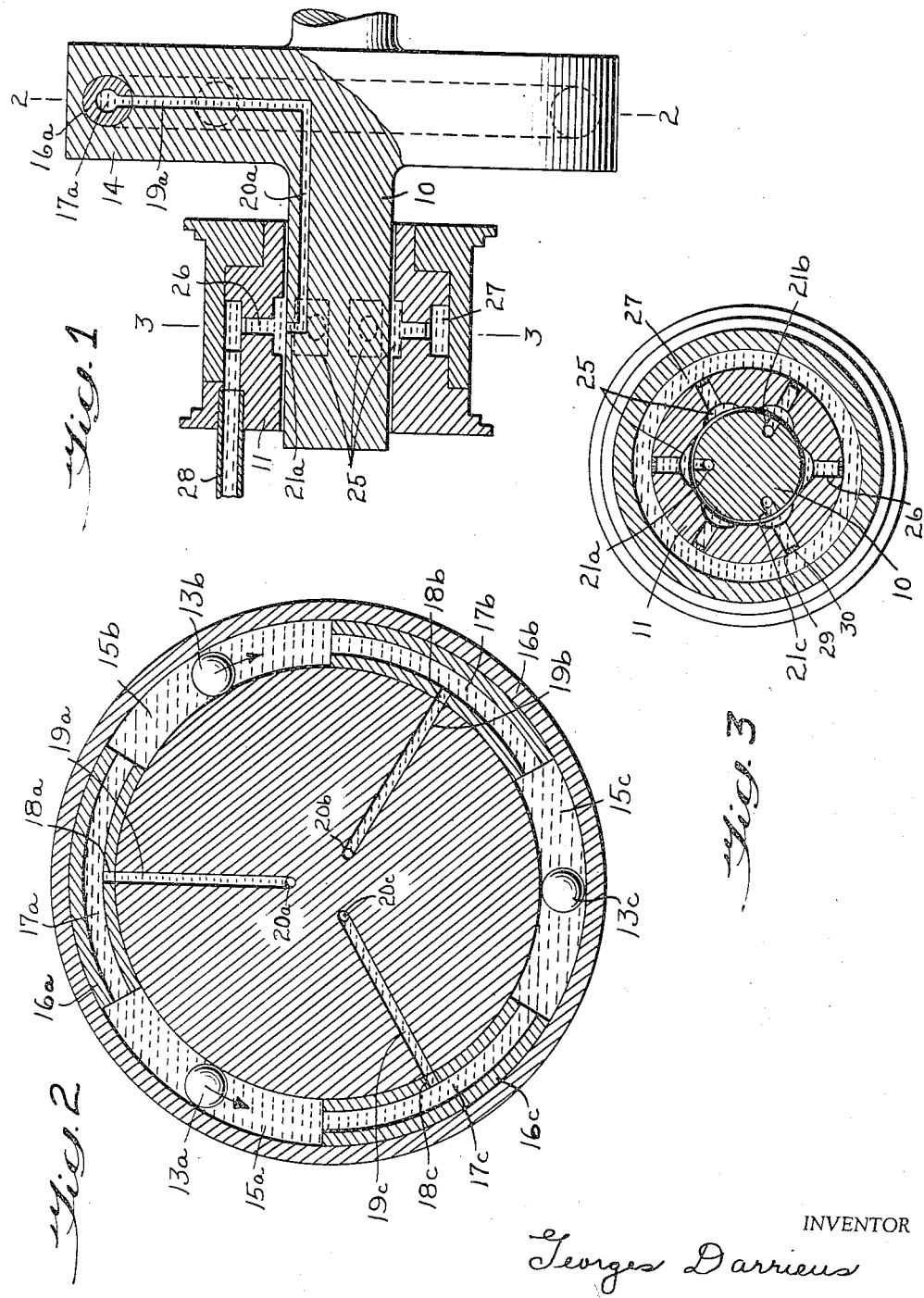
INVENTOR
Georges Darrieus
BY Pierce, Scheffler & Parker
ATTORNEY United States Patent Office 2,778,243
Patented Jan. 22, 1957

2,778,243
DEVICE FOR AUTOMATIC BALANCING OF ROTATING MACHINE PARTS

Georges Darrieus, Houilles, France, assignor to Aktiengesellschaft Brown, Boveri & Cie, Baden, Switzerland, a joint-stock company Application June 22, 1953, Serial No. 363,158

Claims priority, application France June 26, 1952

2 Claims. (Cl. 74—573)

The present invention relates to apparatus for dynamic balancing of rotary machine parts and particularly to those classes of machines such as for example, centrifuges, grinding machines and the like wherein operating conditions envolve unpredictable and random displacement of the rotating masses. Because of the unpredictable nature of the imbalance, the balancing systems have to be designed in such manner that the imbalance will be compensated out in an automatic manner whenever and at whatever place or places it may occur.

In my co-pending application Serial No. 296,023, filed June 27, 1952, now U. S. Patent No. 2,659,243 issued November 17, 1953, there is described and claimed an automatically operating rebalancing device wherein the revolving reactive forces generated in the sleeve bearings, which support the rotary part, as a result of any imbalance bring about corresponding changes in the pressure of the lubricating medium utilized in the bearings, and these pressure changes are then utilized to effect positive and corresponding imbalance compensating changes in the positions of a plurality of normally symmetrically positioned balancing members such as balls or rollers arranged for displacement along an arcuate path concentric with the shaft axis of the rotating member. The balancer is entirely automatic in character, has a very high order of response sensitivity and any imbalance is compensated out as soon as the slightest revolving centrifugal force of reaction occurs in the bearings.

The present invention is directed to an improvement upon the construction for the bearing sleeves shown in my co-pending application in which the differential oil pressure conditions are developed as a result of imbalance and which serve to effect the necessary shifting of the rebalancing masses.

The shifting of these rebalancing masses is dependent upon the amount of lubricating liquid which flows through the pressure relieving outlets in the bearing. To effect a rebalance at an acceptably rapid rate a relatively large cross section has to be given to these outlets in the sleeve as compared with the amount of lubricating liquid needed for the rebalancing operation but this however results in an undesirable and excessively great pressure drop in those parts of the lubrication layer which lie immediately next to such outlets. In order to eliminate this disadvantage, the present invention provides a novel construction for the pressure relieving outlets in the sleeve bearing which comprises a plurality of chambers distributed around the inner surface of the bearing sleeve confronting the shaft which act as supply chambers for feeding lubricating liquid to and withdrawing such liquid from the balancing device. The size of the opening of each of these chambers at the inner surface of the bearing sleeve and the cross-sectional area of the supply-opening for the liquid to each chamber is so chosen that the amounts of liquid brought in to the chambers to obtain a fast shifting of the balancing masses as well as adequate lubrication of the bearing are ensured.

In the accompanying drawings which depict one practical embodiment of the invention and which is to be considered as typical rather than limitative of the structural forms possible within the scope of the inventive concept defined in the appended claims, Fig. 1 is a longitudinal view partly in section at one end bearing portion of the shaft element of a rotary member (not shown) and which is provided with a rebalancing device of the type utilized with the present invention;

Fig. 2 is a transverse section through the automatic balancer device taken on line 2—2 of Fig. 1; and Fig. 3 is a transverse section taken on line 3—3 of Fig. 1.

Referring now more particularly to Figs. 1–3, numeral 10 designates one end portion of the shaft element of a rotary member (not illustrated) and which is mounted in a stationary bearing sleeve 11. The automatic balancer is comprised of a plurality of balancing masses in the form of rolling bodies such as the balls 13a, 13b, 13c contained within a cylindrical body member 14 made rotatable with the shaft. The balls are disposed symmetrically about the shaft axis and are arranged for movement along an arcuate rolling path concentric with the axis of shaft 10 and which is constituted by an annular space provided in the body 14, and which is divided circumferentially into three separate sections 15a, 15b, 15c each containing one of the balls by means of identical arcuate inserts 16a, 16b, 16c circular in transverse section and which are so arranged that the three space sections 15a, 15b, 15c are of equal length.

Insert 16a is provided with a longitudinal bore 17a extending from one end to the other so as to communicate with the spaces or chambers 15a, 15b, adjacent such ends and a transverse bore 18a extending radially inward from bore 17a, the bore 18a being in alignment and communicative with a radially extending bore 19a in the body 14. At its innermost end, bore 19a communicates with another bore 20a extending longitudinally through the body 14 and shaft 10 in the direction of bearing sleeve 11. Bore 20a in turn communicates with a radially arranged bore 21a extending radially outward in the shaft to that portion of the surface of the latter which is situated within the bearing sleeve 11. Moreover, in this embodiment, which is adapted for use on apparatus designed to run at speeds below its critical speed, it is necessary that the bore 21a be in radial alignment and on the same side of the shaft as the bore 19a associated therewith since any revolving centrifugal force created in the shaft 10 because of an overbalance will be directed toward the location of such overbalance.

In a similar manner, the two other arcuate inserts 16b, 16c are provided with longitudinal bores 17b, 17c, transverse bores 18b, 18c, and bores 19b, 19c and 20b, 20c lead to other pairs of bores 21b, 21c in the shaft which are in radial alignment with and extend in the same direction as their associated bores 19b, 19c. Being symmetrically disposed, bores 18a, 18b and 18c are spaced 120° apart and the same is true for the other radial bores described.

Assuming a condition of overbalance to exist in the rotating member, the pressure in the oil film between sleeve 11 and the surface of shaft 10 in a radial direction at the mouth of each of the bores 21 will have as a general rule a first and varying pressure component which stems from external forces acting on the rotating body (for example its weight) and is fixed in its spatial direction, and a second pressure component constant in time but variable along the periphery, which stems from the centrifugal force attributable to the overbalance and which revolves at a velocity synchronous with that of the shaft 10. The first pressure component, also of a frequency equal to that of the shaft rotation, does not enter into consideration because of the viscosity and inertia of the oil and of the balancing masses 13a—13c. The constant component is however reflected by a change in pressure in the oil film, the pressure being greatest in the plane and direction of the overbalance and smallest in the opposite direction. Thus under the influence of these momentary differences in pressure, the bores whose mouths lie in the general direction of the overbalance such as bore 21a for example, derive continuously from the oil film of the bearing a little of the oil while the opposite bores 21b, 21c at the side away from the overbalance return a corresponding amount of oil to the film. The surface of the balls 13a—13c have a minimum running clearance with the walls defining the annular chambers 15a, 15b, 15c and consequently the balls are displaced in their chambers by the oil in the manner of pistons. The direction and amplitude of the ball displacement will automatically be such as to gradually compensate for the overbalance until the rotating member is once again in a state of dynamic balance. Thus for example should the overbalance be in the direction of the bore 21a shown in Fig. 1, oil under pressure will flow through bores 20a, 19a, 18a, and 17a to chambers 15a, 15b causing displacement of the balls 13a, 13b therein in the direction indicated by the arrows away from the direction of overbalance. Because of the lower oil pressures at the mouths of bores 21b, 21c, oil displaced by movement of balls 13a, 13b is able to return to such bores from the chambers 15a, 15b through bores 17b, 17c, 18b, 18c, 19b, 19c and 20b, 20c.

Another balance organization like that shown in Figs. 1–2 is arranged at the opposite end of the rotary body adjacent the bearing at such end thus providing a complete static and dynamic balance for the body.

The construction so far described is that shown and claimed in my aforesaid application Serial No. 296,023 and which has been included by way of background information essential to an understanding of the present improvement directed to the construction of the sleeve bearing and more particularly the parts adjacent the mouths of the bores 21a—21c which convey lubricating liquid such as oil to and from the chambers 15a—15c.

With reference now to Figs. 1 and 3 it will be seen that sleeve bearing 11 is provided with a plurality, six in the present embodiment, of oil supply chambers 25 open at the interior surface of the bearing and which confront the shaft 10 at the plane of bores 21a—21c. Extending radially outward from each chamber 25 is a liquid inlet bore 26 that connects with a circumferentially extending liquid distributing canal 27, and liquid to the latter is supplied by an external conduit 28 which leads from the bearing to a source, not shown. The entrance end to each radial bore 26 from the distributing canal 27 is provided with an insert 29 containing a through bore 30 suitably calibrated to regulate liquid flow between the canal 27 and chambers 25 in accordance with the present invention. With this improved arrangement, one is thus enabled to so relate the size of the chambers 25 at the inner surface of the bearing sleeve to the cross sectional area of the supply openings 30 to such chambers that the amount of lubricating liquid brought in for rapid shifting of the balancing masses 13a—13c as well as adequate lubrication of the bearing are ensured.

In conclusion it will be understood that the specific sleeve bearing construction described and illustrated may be modified and the number of chambers 25 increased or decreased without departing from the spirit and scope of the invention and that moreover the improved bearing may be applied to other species of the rebalancer such as those others shown in my aforesaid Patent No. 2,659,243.

I claim:

1. In an apparatus for automatically balancing a body mounted for rotation about its axis comprising a sleeve bearing surrounding a shaft portion of the body, means providing a film of lubricating liquid between said sleeve and shaft, a balancer member containing a plurality of arcuate chambers positioned symmetrically and concentrically about the axis of the body, each chamber having a balancing mass therein movable along an arcuate path defined by the chamber and conduit means leading from the chambers on opposite sides of the balancing masses therein to outlets at the surface of said shaft and hence to said liquid film, said liquid which forms said film also filling said chambers and conduit means whereby unequal pressures produced in said film at different points circumferentially thereof as a result of any unbalance in the body produce a compensating displacement of said balancing masses to restore the body to a balanced state accompanied by a corresponding flow of said liquid to and from said chambers from and to said bearing sleeve, respectively, the improvement wherein said bearing sleeve includes a plurality of circumferentially spaced and separate chambers open to and confronting said shaft in alignment with the said outlets thereon and each said bearing chamber includes a liquid inlet thereto having an area smaller than that of the bearing chamber, the areas of each liquid inlet and its associated bearing chamber being in such ratio that rapid shifting of said balancing masses as well as adequate lubrication of the bearing are ensured.

2. Apparatus as defined in claim 1 for automatic balancing of a rotatable body wherein said bearing sleeve also includes an internally arranged circumferential channel in communication with each of the inlets to said bearing chambers for distributing said lubricating liquid thereto, and a supply conduit leading to said channel.

References Cited in the file of this patent

UNITED STATES PATENTS

| | | |
|---|---|---|
| 1,209,730 | Leblanc | Dec. 26, 1916 |
| 2,242,184 | Reuter | May 13, 1941 |
| 2,310,309 | Orr | Feb. 9, 1943 |
| 2,659,243 | Darrieus | Nov. 17, 1953 |